Figure 1:
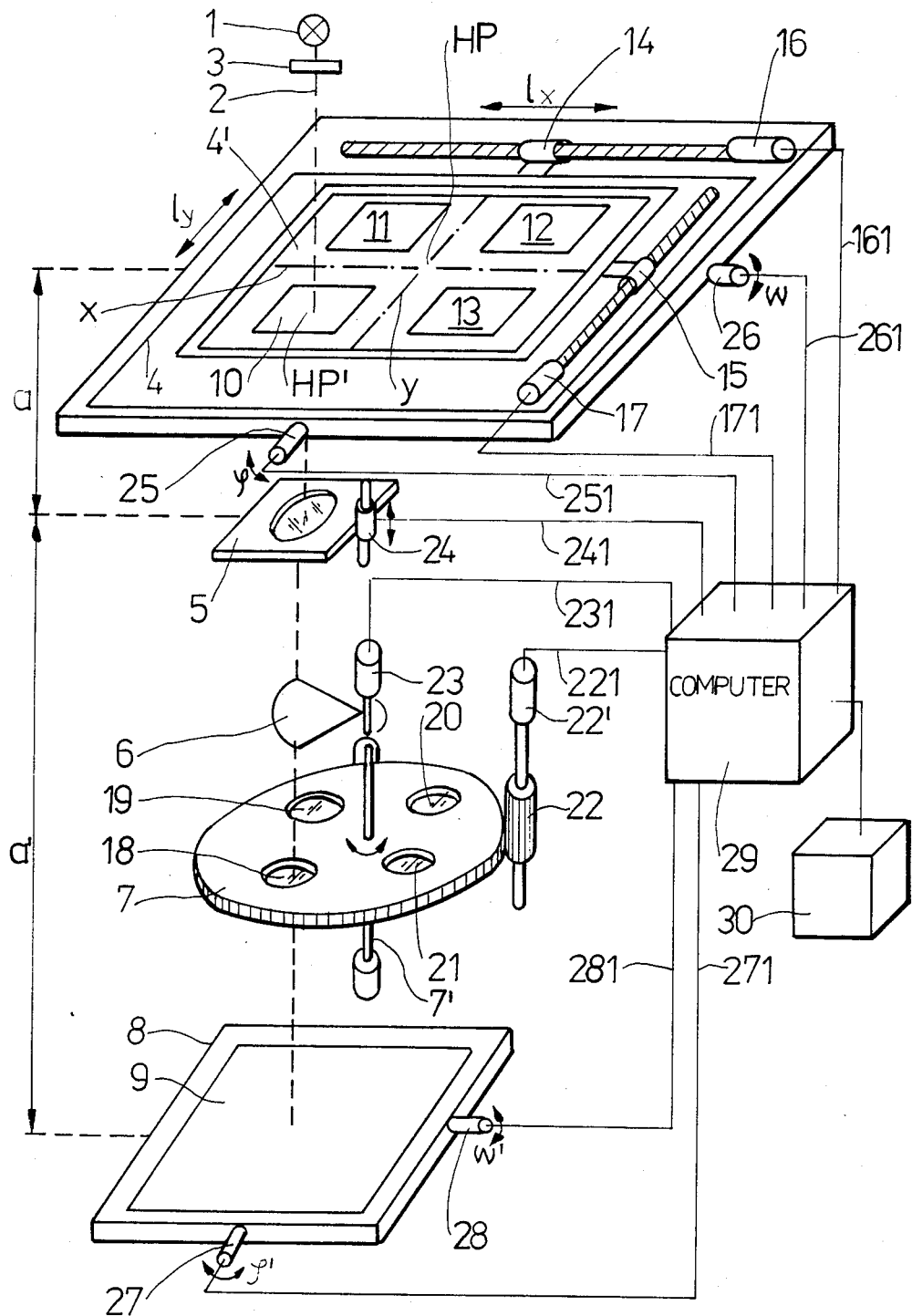

United States Patent [19]

Rulf

[11] Patent Number: 4,575,232
[45] Date of Patent: Mar. 11, 1986

[54] METHOD FOR PRODUCING RECTIFIED AND SUPERIMPOSED IMAGES FROM MULTISPECTRAL PHOTOGRAPHS

[76] Inventor: Joachim Rulf, 30, J.-R.-Becher-Str. 30, 6908 Jena-Winzerla, German Democratic Rep.

[21] Appl. No.: 618,932

[22] Filed: Jun. 8, 1984

[30] Foreign Application Priority Data

Jun. 30, 1983 [DD] German Democratic Rep. .................................. 2525535

[51] Int. Cl.$^4$ ............................................. G03B 27/32
[52] U.S. Cl. ......................................... 355/77; 355/52
[58] Field of Search ..................................... 355/77, 52

[56] References Cited

U.S. PATENT DOCUMENTS

| | | | |
|---|---|---|---|
| 2,830,491 | 4/1958 | Domeshek | 355/52 |
| 3,602,592 | 8/1971 | Collins | 355/77 |
| 4,417,810 | 11/1983 | Ueda et al. | 355/77 |

Primary Examiner—Monroe H. Hayes

[57] ABSTRACT

A method for producing rectified and superimposed images from multispectral photographs particularly for use in evaluation of data obtained by remote sensing comprises the steps of arranging preferably four multispectral photographs in an image plane of a rectifier, aligning in a cyclic repetition of the following steps a first, a second etc. multispectral photograph to the optical axis of the apparatus, setting the degrees of freedom of the apparatus and inserting a color filter the spectral transmissivity of which is adapted preferably to the wavelength at which the photograph was taken and exposing a light sensitive color material in a projection plane subsequently to produce a superimposed and rectified color images. The step of rectifying need not be repeated for each processing of the multispectral photographs.

4 Claims, 2 Drawing Figures

METHOD FOR PRODUCING RECTIFIED AND SUPERIMPOSED IMAGES FROM MULTISPECTRAL PHOTOGRAPHS

The invention relates to a method for rectifying and superimposing photographs taken from multispectral photographs, particularly for use in evaluating multispectral photographs of different spectral composition and density superimposed in order to obtain special informations from photographs made from an aircraft or satellite.

It is known, for example, from the Kompendium Photogrammetrie, Volume XIV, Leipzig 1980, Akademische Verlagsgesellschaft Geest & Portig K.-G., to take identical imaging scale photographs of a selected section of a terrain from an aircraft or spaceship under use of high resolution lens systems, which operate at selected and different ranges of the optical spectrum. (Multispectral camera MKF-6 from Jena, and MSK 4) Heretofore, special apparatus have been employed such as the multispectral projector MSP 4 from Jena to evaluate photographs attained from multispectral photographs which also permit a variation of the scale of the photographs and to superimpose photographs taken at different wavelengths of the visible or infrared.

The MSP4 has four channels to produce a superimposed photograph for visual evaluation, the spectral range and the density of each channel can be varied. The observed superimposed photographs still are defective as concerns image distortions caused by tilt of the camera at the time of exposure.

This can only be overcome by rectifying the original multispectral photographs in a rectifier, as disclosed in the DD-WP No. 148820. Therefore, the MSP4 is disadvantageous since it does not deliver rectified superimposed photographs on sensitive color material as it is very often required in the production of thematical and topographic maps.

It is an object of the present invention to obviate the above disadvantages.

It is a further object of the present invention to provide a method for producing rectified superimposed photographs derived from multispectral photographs in a single apparatus system.

It is still a further object of the present invention to provide a method for producing superimposed photographs from multispectral photographs, the density and spectral composition of the superimposed photographs being optional and for exposing color films with said superimposed photographs.

These and other objects are realised in a method for rectifying and superimposing photographs from multispectral photographs comprising the step of positioning multispectral photographs of a definite spectral range in an image plane of a rectifier relative to an optical axis of the rectifier, setting the values of the degrees of freedom including the Newton and Scheimpflug conditions, inserting spectral filters into an imaging path of beams, and subsequently exposing the rectified photographs upon a common light sensitive color material arranged in a projection plane.

Advantageously at least, one computer is employed for control of setting the degrees of freedom of the rectifier, the exposure time for each multispectral color photograph, and for inserting the proper color filters.

By virtue of the method according to the invention rectified and superimposed color photographs taken from multispectral photographs can be quickly produced without desisting from the advantages of a variable exposure at different spectral ranges, which becomes feasible by employing only one device.

Figure 2:
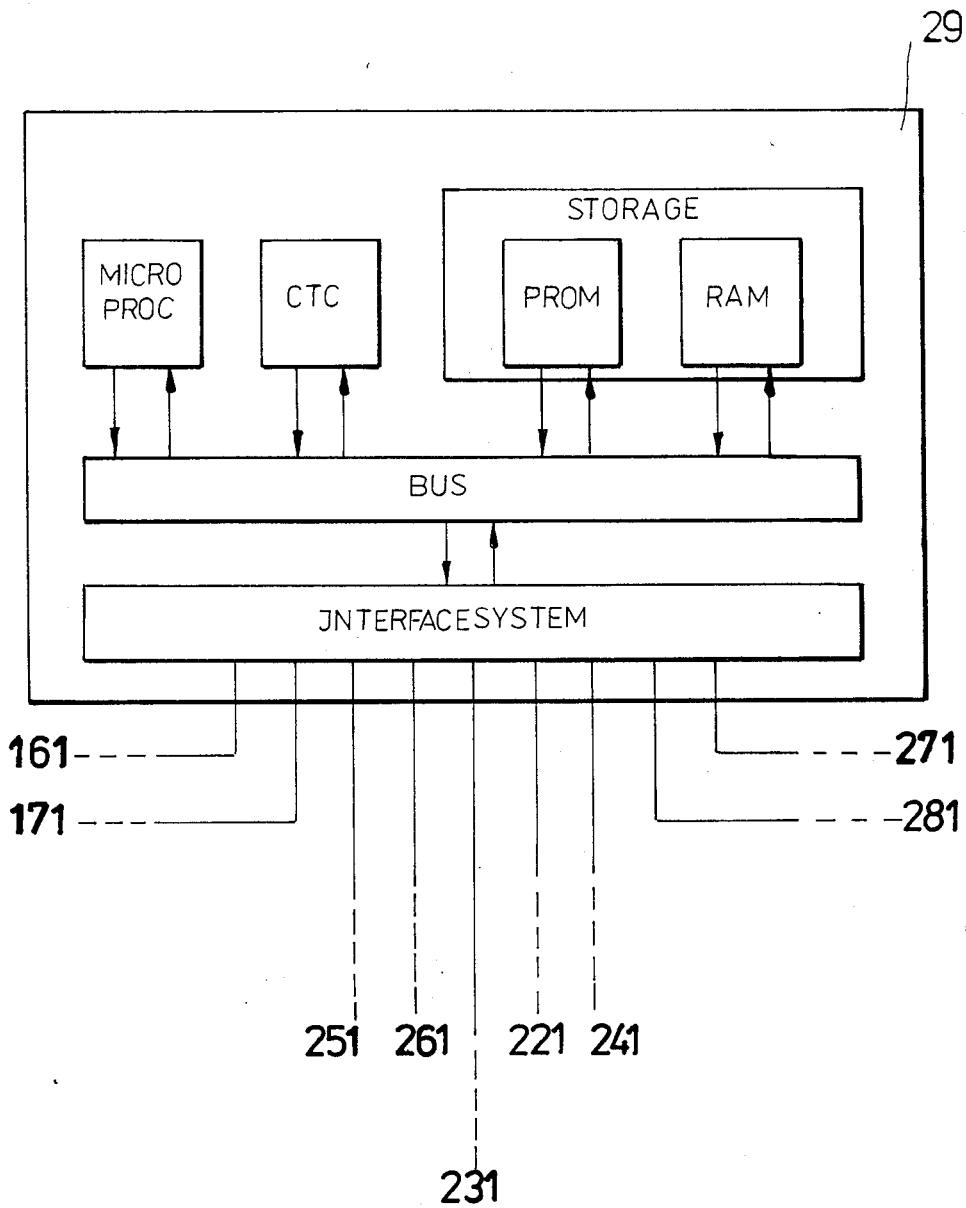

In order that the invention may be more readily understood reference is made to the accompanying drawings which illustrate diagrammatically and by way of example one embodiment thereof and where FIG. 1 is a schematic view of an apparatus for rectifying and exposing in superposition color photographs taken from multispectral photographs, and FIG. 2 is a schematic view of the components of the computer included in FIG. 1.

In FIG. 1 a rectifier comprises about an optical axis 2 a light source 1 arranged at a suitable space above a photograph carrier 4. Four photographs (transparencies) 10, 11, 12, 13 taken by a multispectral camera from a same terrain section at different wavelengths of the spectrum are arranged on a frame 4' subdivided into four quadrants of the photograph carrier 4. The photographs 10, 11, 12, 13 are already aligned to one another, that is, their sides are in parallel or at right angles, respectively.

The photograph carrier 4 is displaceable in a horizontal plane by means of a displacement means 17 including a servo-motor, a rotary encoder, and a shaft and nut 15 combination for displacement of the carrier 4 in $e_y$ direction and a displacement means 16 including a servo-motor, a rotary encoder which via a shaft and nut 14 combination effects a displacement of the carrier 4 in $e_x$ direction. Furthermore, the carrier 4 permits tilting about two axes of tilt (25, 26) which are at right angles to one another and intersect in the center of the carrier 4 by means of which tiltings about an angle $\phi$ and an angle $\omega$, respectively, are accomplished. (The numbers 25,26 also designate the tilting means.) The light source 1 emits a beam of light which covers the entire spectral range of the visible.

A subsequent condenser lens 3 serves to fully illuminate the underneath photograph 10 aligned to the optical axis 2. The photograph 10 is followed by a projection lens 5 in said optical axis 2. The mount of the lens 5 is provided with means 24 for adjusting the vertical position of the lens 5 relative to a projection table 8 and the carrier 4, respectively.

A shutter 6 for exposure control is connected to a servo-motor 23 which actuates the shutter 6 by rotating the latter into or out of the optical axis 2. The shutter 6 is followed by a filter disc 7 which, for example, has four circular openings 18, 19, 20, 21 in which color filters of different spectral transmissivity are provided.

The filter disc 7 is seated for rotation about a central axle 7' and is revolved about the latter by a pinion 22 meshing a toothed rim portion of the disc 7. The pinion 22 is connected to a servo-motor 22'. The openings 18, 19, 20, 21 are equally spaced relative to said central axle 7' so when the disc is revolved the filters are inserted into the beam of light (2). A projection table 8 is provided in the projection plane of the projection lens 5. A photosensitive color material 9 is attached to the top face of the projection table 8. The latter is tiltable about two horizontal axes 27, 28 (tilting means) which are at right angles to one another, the double arrows $\phi'$, and $\omega'$, respectively, designate the tilting movement.

The servo-motors and tiltings means, respectively, 16, 17, 22', 23, 24, 25, 26, 27, 28 are connected via respective lines 161, 171, 221, 231, 241, 251, 261, 271, 281 to a computer 29.

By respective control signals the computer 29 controls the mutual positions of the members 4, 5, 8 to one another, the exposure time, the rotational position of the filter disc 7, and the selection of the respective color filter adapted to the spectral range of the original multispectral photograph, respectively, as well as the selection of the multispectral photograph to be processed.

In operation, the four multispectral photographs 10, 11, 12, 13 are mounted in the frame 4' which has two orientation lines x, y in the intersection of which a principal point HP is located. The lines x, y subdivided the frame 4' into four substantially equal sections. By means of the generally known fiducial marks (not visible) provided on the photographs 10,11,12,13 the latter are aligned relative to the principal point HP and to the lines x, y and to associate fiducial marks on the frame 4' so that they are in parallel and at right angles, respectively, to the lines x, y.

The aligned multispectral photographs mounted in the frame 4' are inserted with the frame 4' into the carrier 4. Not shown adjusting means provided both, on the carrier 4 and the frame 4' ensure that the frame 4' and the multispectral photographs are in a defined position in the rectifying system and the defined position data are stored in a storage (RAM of computer 29). In this manner a coincidence of the superimposed photographs is ensured.

In the following the operation is performed according to the invention.

The frame 4' carrying the four multispectral photographs is aligned to the principal point HP' of the entire rectifier system which is defined by the optical axis 2 so that the principle points HP and HP' coincide. Since the coordinates of the principle point HP (HP') are stored in the RAM of the Computer 29 a reference point for the following positioning movements is given.

In a first step the transparency (black-and-white photograph) 10 is moved into the position shown in FIG. 1. The RAM (FIG. 2) feeds the data for the displaced position of the transparency 10, and, hence, for the respective carrier 4 position into a microprocessor unit (CPU of FIG. 2) of the computer 29. The displacement means 16 and 17 receive via the lines 161 and 171, respectively, signals from the computer 29 to actuate the servo-motors (16, 17) which via the nut and screw combinations (14, 15) displace the carriers 4' and 4 in x, y direction until the position of the transparency 10 as shown in FIG. 1 is attained. The shaft encoders (16, 17) deliver via lines 161 and 171, respectively, position signals of the actual transparency 10 position to the computer 29 which compares these signals to the nominal position values obtained from the RAM of 29 until the actual and nominal value signals are equal.

Then, in a next step the filter 18 is inserted into the optical axis 2. This spectral filter 18, has, for example, a spectral wavelength transmissivity corresponding to the wavelength of the multispectral photograph 10 taken by the multispectral camera. The respective data are also stored in the RAM of the computer 29. The data are fed into the CPU which associates the color filter 18 to the transparency 10 to the extend that a signal is fed via the line 221 into the servo-motor 22' which via the pinion 22 rotates the filter disc 7. A not shown position indicator delivers signals of the actual position of the filter disc 7 to the computer 29 which stops the servo-motor 22' when the desired position is attained. After insertion of the color filter 18 into the optical axis 2 and, hence, into the path of the projection lens 5, the CPU of the computer 29 interrogates the RAM to obtain the exposure time for the exposure of the photosensitive material 9 on projection table 8. According to the respective data the CPU operates the servo-motor 23 via the line 231 so that the latter moves the shutter 6 out of the optical axis 2. The projection of the transparency 10 via the lens 5 exposes the photosensitive material 9 on the table 8 for the appropriate time. The time is controlled by a CTC of the computer 29 (counter time circuit).

Before the steps as described hereinbefore have been carried out the rectification of the multispectral photographs is performed, for example, before the step of positioning the multispectral photograph 10. The transparency 10 is rectified either to the passpoint method or to the setting value procedure which is disclosed, for example, in the U.S. patent application Ser. N0. 388,687. The rectifying operation is controlled by the computer 29 which sets the tilt $\phi'$, $\omega'$, via the lines 271 and 281, respectively, of the projection table 8 by operation of the servo-motors 27, 28, the distance a' between the projection table 8 and the projection lens 5 and the position of the principal fiducial mark HP be setting $e_x$ and $e_y$ via the servo-motors 16, 17.

Furthermore, the Newton and Scheimpflug conditions are realised, that is, the distance a between the lens 5 and the photograph carrier 4 is set and the $\phi,\omega$- tilts of the latter are adjusted. This is described in more detail in Gruber "Photogrammetry", Chapmann & Hall Ltd. London 1932, page 13 ff, and Ch. C. Slama, "Manual of Photogrammetry-Fourth Ed." Falls Church 1980. Then the next transparency 11 is moved into the optical axis 2 by operation of the computer 29 via the setting means 16 and 17.

The positioning is performed in analogy to that of the photograph 10. Since the photographs 10, 11, 12 and 13 have been taken at substantially the same time from a same section of terrain the rectifying operation has to be performed only once. Then the color filter is changed, for example, filter 19 is moved into the optical axis 2. Again this color filter 19 satisfies the conditions set forth hereinbefore. The further steps are in analogy to those in connection with exposing the photograph 10. In this manner a superposition of the multispectral photographs on the table 8 is attained and the resulting superpositioned image 9 is a rectified color photograph. At least two multispectral transparencies are superimposed. It depends on the informations which have to be evaluated from multispectral photographs which spectral ranges are processed. When, for example, the ripeness of corn has to be determined it would be advisable to use the green and infrared photographs.

The invention is not restricted to the above embodiment. It is feasible to employ a rotatable photograph carrier with a tiltable inside frame. Also any suitable color filter and shutter arrangement is feasible. The projection lens can be a zoom lens. An aperture for the projection lens 5 has been omitted for the sake of simplicity.

Furthermore, it is known to connect the computer 29 components, namely the CPU, the CTC, the RAM, the PROM via a Bus to an interface system which connects the components to the respective means of the rectifier. The ROM contains the program for the operation of the CPU, CTC and the RAM and need not be explained in detail since it is generally known how to establish flow-charts.

Furthermore, an input unit/operator's desk 30 for setting, programming and/or starting and/or stopping the computer 29 has neither been described in detail for the sake of simplicity.

I claim:

1. A method for producing rectified and superimposed images from at least two multispectral photographs in a rectifier which has about an optical axis a photograph carrier for supporting the multispectral photographs,

- a means for illuminating and means for displacing/tilting the same,
- a projection lens and means for displacing the latter relative to the photograph carrier,
- a color filter revolver and a projection table for supporting a light sensitive material for being exposed through said projection lens and a respective color filter, including means for displacing and/or tilting said projection table, and for displacing said projection lens relative to said projection table, and means for revolving said color filter revolver, comprising

- an initial step of inserting at least two multispectral photographs being in an aligned position relative to one another into a frame of said photograph carrier ensuring an adjusted position of said multispectral photographs relative to said photograph carrier,
- a first step of positioning a multispectral photograph of said at least two multispectral photographs in said optical axis of said rectifier, and accurately aligning said multispectral photograph relative to said optical axis by operation of said means for displacing said photograph carrier,
- a second step of setting the displacement means and tilting means, respectively, provided for the image carrier, the projection lens and the projection table according to the Scheimpflug and Newton conditions in order to rectify the multispectral photographs,
- a third step of inserting a color filter of said color filter revolver being adapted to the spectral range of the multi-spectral photograph present in the optical axis into the latter,
- a fourth step of removing a shutter out from the optical axis for a required exposure time to expose said light sensitive color material in the projection table plane,
- a fifth step of moving a next multispectral photograph, if any, into the optical axis and repeating the third, fourth and fifth step to expose a multispectral photograph in accurate superposition to a previous one on the light sensitive color material.

2. A method for producing rectified and superimposed images from multispectral photographs in a rectifier which has about an optical axis a photograph carrier for supporting the multispectral photographs,

- a means for illuminating and means for displacing/tilting the same,
- a projection lens and means for displacing the latter relative to the photograph carrier,
- a color filter revolver and a projection table for supporting a light sensitive material for being exposed through said projection lens and a respective color filter, including means for displacing and/or tilting said projection table, and for displacing said projection lens relative to said projection table, and means for revolving said color filter revolver, comprising

- an initial step of inserting at least two multispectral photographs being in an aligned position relative to one another into a frame of said photograph carrier ensuring an adjusted position of said multispectral photographs relative to said photograph carrier,
- a first step of positioning a multispectral photograph of said at least two multispectral photographs in said optical axis of said rectifier, and accurately aligning said multispectral photograph relative to said optical axis by operation of said means for displacing said photograph carrier,
- a second step of inserting a color filter of said color filter revolver being adapted to the spectral range of the multispectral photograph present in the optical axis into the latter,
- a third step of setting the displacement means and tilting means, respectively, provided for the image carrier, the projection lens and the projection table according to the Scheimpflug and Newton conditions in order to rectify the multispectral photographs,
- a fourth step of removing a shutter out from the optical axis for a required exposure time to expose said light sensitive color material in the projection table plane,
- a fifth step of moving a next multispectral photograph, if any, into the optical axis and repeating the second, fourth and fifth step to expose a multispectral photograph in accurate superposition to a previous one on the light sensitive color material.

3. A method as claimed in claim 1, wherein at least one computer is provided for control of the displacement and tilting means, respectively, for performing the individual steps.

4. A method as claimed in claim 2, wherein at least one computer is provided for control of the displacement and tilting means, respectively, for performing the individual steps.

* * * * *